(12) United States Patent
Arikawa et al.

(10) Patent No.: US 10,580,434 B2
(45) Date of Patent: Mar. 3, 2020

(54) INFORMATION PRESENTATION APPARATUS, INFORMATION PRESENTATION METHOD, AND NON-TRANSITORY COMPUTER READABLE MEDIUM

(71) Applicant: FUJI XEROX CO., LTD., Tokyo (JP)

(72) Inventors: Kiichiro Arikawa, Kanagawa (JP); Daisuke Yasuoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/121,289

(22) Filed: Sep. 4, 2018

(65) Prior Publication Data

US 2019/0279656 A1 Sep. 12, 2019

(30) Foreign Application Priority Data

Mar. 12, 2018 (JP) ................. 2018-044552

(51) Int. Cl.
| | |
|---|---|
| *G10L 25/63* | (2013.01) |
| *G10L 15/02* | (2006.01) |
| *G10L 21/10* | (2013.01) |
| *G06F 16/00* | (2019.01) |
| *G06Q 50/20* | (2012.01) |
| *G06F 17/27* | (2006.01) |
| *G10L 15/26* | (2006.01) |

(52) U.S. Cl.
CPC ............. *G10L 25/63* (2013.01); *G06F 16/00* (2019.01); *G06Q 50/20* (2013.01); *G10L 15/02* (2013.01); *G10L 21/10* (2013.01); *G06F 17/27* (2013.01); *G10L 15/26* (2013.01)

(58) Field of Classification Search
USPC .............................. 704/1–504; 707/737, 748
See application file for complete search history.

(56) References Cited

U.S. PATENT DOCUMENTS

| | | | | |
|---|---|---|---|---|
| 6,151,571 | A | * | 11/2000 | Pertrushin ............... G10L 17/26 704/207 |
| 6,275,806 | B1 | * | 8/2001 | Pertrushin ............... G10L 17/26 704/270 |
| 6,353,810 | B1 | * | 3/2002 | Petrushin ................ G10L 17/26 704/236 |
| 6,427,137 | B2 | * | 7/2002 | Petrushin ................ G10L 17/26 704/209 |
| 7,548,891 | B2 | * | 6/2009 | Ono ........................ A63F 13/10 706/12 |
| 8,965,770 | B2 | * | 2/2015 | Petrushin ................ G10L 17/26 704/270 |

(Continued)

FOREIGN PATENT DOCUMENTS

| | | |
|---|---|---|
| JP | 2007-114702 A | 5/2007 |
| JP | 2012-173566 A | 9/2012 |
| JP | 6142616 B2 | 6/2017 |

*Primary Examiner* — Marcus T Riley
(74) *Attorney, Agent, or Firm* — Oliff PLC

(57) ABSTRACT

An information presentation apparatus includes an acquisition unit and a presentation unit. The acquisition unit acquires activity information on activities of people in a group including multiple people having a conversation about a specific theme. The presentation unit presents an advice regarding progress of the conversation in accordance with a situation of the conversation defined based on the activity information acquired by the acquisition unit.

13 Claims, 15 Drawing Sheets

(56) References Cited

U.S. PATENT DOCUMENTS

| | | | | |
|---|---|---|---|---|
| 2001/0056349 | A1* | 12/2001 | St. John | G07C 9/00158 704/270 |
| 2002/0002460 | A1* | 1/2002 | Pertrushin | G10L 17/26 704/270 |
| 2002/0002464 | A1* | 1/2002 | Petrushin | G10L 17/26 704/275 |
| 2002/0010587 | A1* | 1/2002 | Pertrushin | G10L 17/26 704/275 |
| 2003/0023444 | A1* | 1/2003 | St. John | H04M 3/382 704/270.1 |
| 2007/0071206 | A1* | 3/2007 | Gainsboro | H04M 3/2281 379/168 |
| 2008/0240379 | A1* | 10/2008 | Maislos | H04M 3/4938 379/88.13 |
| 2010/0041958 | A1* | 2/2010 | Leuthardt | G06F 19/3481 600/300 |
| 2011/0178803 | A1* | 7/2011 | Petrushin | G10L 17/26 704/270 |
| 2014/0297641 | A1* | 10/2014 | Mayumi | H04L 65/403 707/737 |
| 2017/0133035 | A1* | 5/2017 | Jeon | H04R 1/10 |
| 2019/0279656 | A1* | 9/2019 | Arikawa | G06Q 50/20 |

\* cited by examiner

FIG. 7

| LEVEL | DETERMINATION METHOD | DEFINITION |
|---|---|---|
| 1 | UTTERANCE TIME (SECONDS)/60 SECONDS×100% IS 0% OR MORE AND LESS THAN 20% | LEAST ACTIVE DISCUSSION |
| 2 | UTTERANCE TIME (SECONDS)/60 SECONDS×100% IS 20% OR MORE AND LESS THAN 40% | A FEW REMARKS |
| 3 | UTTERANCE TIME (SECONDS)/60 SECONDS×100% IS 40% OR MORE AND LESS THAN 60% | SOME DISCUSSIONS BUT NOT MANY REMARKS |
| 4 | UTTERANCE TIME (SECONDS)/60 SECONDS×100% IS 60% OR MORE AND LESS THAN 80% | ACTIVE DISCUSSIONS |
| 5 | UTTERANCE TIME (SECONDS)/60 SECONDS×100% IS 80% OR MORE AND LESS THAN OR EQUAL TO 100% | VERY ACTIVE DISCUSSIONS |

FIG. 8

| LEVEL | DETERMINATION METHOD | DEFINITION |
|---|---|---|
| 1 | AVERAGE POWER SPECTRAL RATIO β/α IS LESS THAN 0.7 | RELAXED AND LOW THINKING POWER |
| 2 | AVERAGE POWER SPECTRAL RATIO β/α IS 0.7 OR MORE AND LESS THAN 0.9 | BETWEEN LEVEL 1 AND LEVEL 3 |
| 3 | AVERAGE POWER SPECTRAL RATIO β/α IS 0.9 OR MORE AND LESS THAN 1.1 | RELAXED AND SATISFACTORY THINKING POWER BUT NOT HIGH ENOUGH TO INCREASE COGNITIVE LEVEL |
| 4 | AVERAGE POWER SPECTRAL RATIO β/α IS 1.1 OR MORE AND LESS THAN 1.3 | BETWEEN LEVEL 3 AND LEVEL 5 |
| 5 | AVERAGE POWER SPECTRAL RATIO β/α IS 1.3 OR MORE | HIGH THINKING POWER AND IDEAL FOR INCREASING COGNITIVE LEVEL |

FIG. 10

| LEVEL | DETERMINATION METHOD | DEFINITION |
|---|---|---|
| 1 | PROPORTION OF DOTS IN AREA A IN ALL PLOTS IS 0% OR MORE AND LESS THAN 20% | DECREASED THINKING POWER AND NOT SUITABLE FOR LEARNING |
| 2 | PROPORTION OF DOTS IN AREA A IN ALL PLOTS IS 20% OR MORE AND LESS THAN 40% | SLIGHTLY CLOSE TO LEVEL 1 |
| 3 | PROPORTION OF DOTS IN AREA A IN ALL PLOTS IS 40% OR MORE AND LESS THAN 60% | INTERMEDIATE STATE |
| 4 | PROPORTION OF DOTS IN AREA A IN ALL PLOTS IS 60% OR MORE AND LESS THAN 80% | SLIGHTLY CLOSE TO LEVEL 5 |
| 5 | PROPORTION OF DOTS IN AREA A IN ALL PLOTS IS 80% OR MORE AND LESS THAN OR EQUAL TO 100% | POSITIVE STATE AND HIGH LEARNING EFFECTS EXPECTED |

FIG. 13

| ITEM NAME | SITUATION OF CONVERSATION | ADVICE (RECOMMENDED TEACHER'S ACTION) | SCENE |
|---|---|---|---|
| REST | · CONVERSATION LEVEL IS HIGH BUT CONCENTRATION LEVEL IS SIGNIFICANTLY DECREASED COMPARED TO CERTAIN PERIOD OF TIME AGO (BORED OF TALK, DULL MOOD, STUCK ON DIFFICULT TALK). | · CHANGE TOPIC TO BE DEVIATED FROM THEME OF CONVERSATION<br>· BRING UP TOPIC STUDENTS SEEM TO BE INTERESTED IN<br>· TAKE A BREAK | CONVERSATION |
| ROUND ROBIN | · CONVERSATION LEVEL IS STILL LOW EVEN AFTER CERTAIN PERIOD OF TIME HAS PASSED SINCE START OF REMARKS (TALK HAS NOT GOT LIVELY EVEN AFTER CERTAIN PERIOD OF TIME HAS PASSED). | · TO EASE TENSION, PROMPT STUDENTS TO SPEAK ONE BY ONE IN TURN | CONVERSATION |
| CHANGE | · TOTAL CONCENTRATION LEVEL OF STUDENTS IS DECREASED.<br>· ORIGINAL CONCENTRATION LEVEL IS LOW (IN AFTERNOON CLASS ETC., ABILITY OF CONCENTRATION OF STUDENTS IS DECREASED WHEN LISTENING TO TEACHER AS WELL AS HAVING CONVERSATION). | · CHANGE CONTENTS FROM CURRENT LECTURE TO DIFFERENT ONE STUDENTS SEEM TO BE INTERESTED IN | ALL |
| FOCUS | · ACCORDING TO SEMANTIC COMPREHENSION OF CONTENTS OF CONVERSATION, CONTENTS OF CONVERSATION ARE LESS RELEVANT TO THEME OF CONVERSATION, AND CONCENTRATION LEVEL IS LOW (IRRELEVANT CHATTER, RELAXED BY CHATTER). | · TO REDIRECT COURSE, REPRESENT THEME AND GOAL OF CONVERSATION AND GIVE GUIDANCE BY PRESENTING EXAMPLE IF POSSIBLE. | CONVERSATION |
| SPREAD | · WHEN CERTAIN PERIOD OF TIME HAS PASSED SINCE START OF CONVERSATION, NUMBER OF UTTERERS IS SMALL IN SPITE OF HIGH UTTERANCE LEVEL (HIGH CONCENTRATION, BUT ONLY SOME PEOPLE SPEAK) | · PROMPT STUDENT WHO HAS NOT SPOKEN TO SPEAK AND MAKE A REMARK ON CONTENTS OF CONVERSATION | CONVERSATION |

INFORMATION PRESENTATION APPARATUS, INFORMATION PRESENTATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-044552 filed Mar. 12, 2018.

BACKGROUND (i) Technical Field

The present disclosure relates to an information presentation apparatus, an information presentation method, and a non-transitory computer readable medium.

(ii) Related Art

Japanese Patent No. 6142616 discloses a discussion support program for causing a computer to execute a process comprising collecting opinion data including an opinion type indicating approval or disapproval for an object from a plurality of information terminals formed in a loop; storing the opinion data for each group into a memory; comparing an opinion type included in representative opinion data representing the group with an opinion type of opinion data other than the representative opinion data in the group by referring to the memory; and calculating a point for a participant associated with an information terminal from which the representative opinion data is transmitted, based on a result of the comparison.

SUMMARY

There are scenes where a group of multiple people have a conversation about a specific theme, such as a class at school, a group work (group discussion) in a class, a workshop in a lecture class, and the like. In scenes where a group of people have a conversation, the quality of the conversation needs to be improved to acquire an outcome such as learning effects. In order to improve the quality of a conversation, the progress of the conversation needs to be managed.

However, skills are required for management of the progress of a conversation, and a heavy burden is imposed on an individual who is in charge of the progress of the conversation.

Aspects of non-limiting embodiments of the present disclosure relate to providing an information presentation apparatus, an information presentation method, and a non-transitory computer readable medium that are able to facilitate the progress of a conversation.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information presentation apparatus including an acquisition unit and a presentation unit. The acquisition unit acquires activity information on activities of people in a group including multiple people having a conversation about a specific theme. The presentation unit presents an advice regarding progress of the conversation in accordance with a situation of the conversation defined based on the activity information acquired by the acquisition unit.

BRIEF DESCRIPTION OF THE DRAWINGS

Exemplary embodiments of the present disclosure will be described in detail based on the following figures, wherein:

FIG. 7 is a table indicating determination criteria for an utterance level;

FIG. 8 is a table indicating determination criteria for a concentration level;

FIG. 10 is a table indicating different determination criteria for the concentration level;

FIG. 13 is a table indicating situations of conversations and contents of advices corresponding to the situations of the conversations;

DETAILED DESCRIPTION

Figure 1:
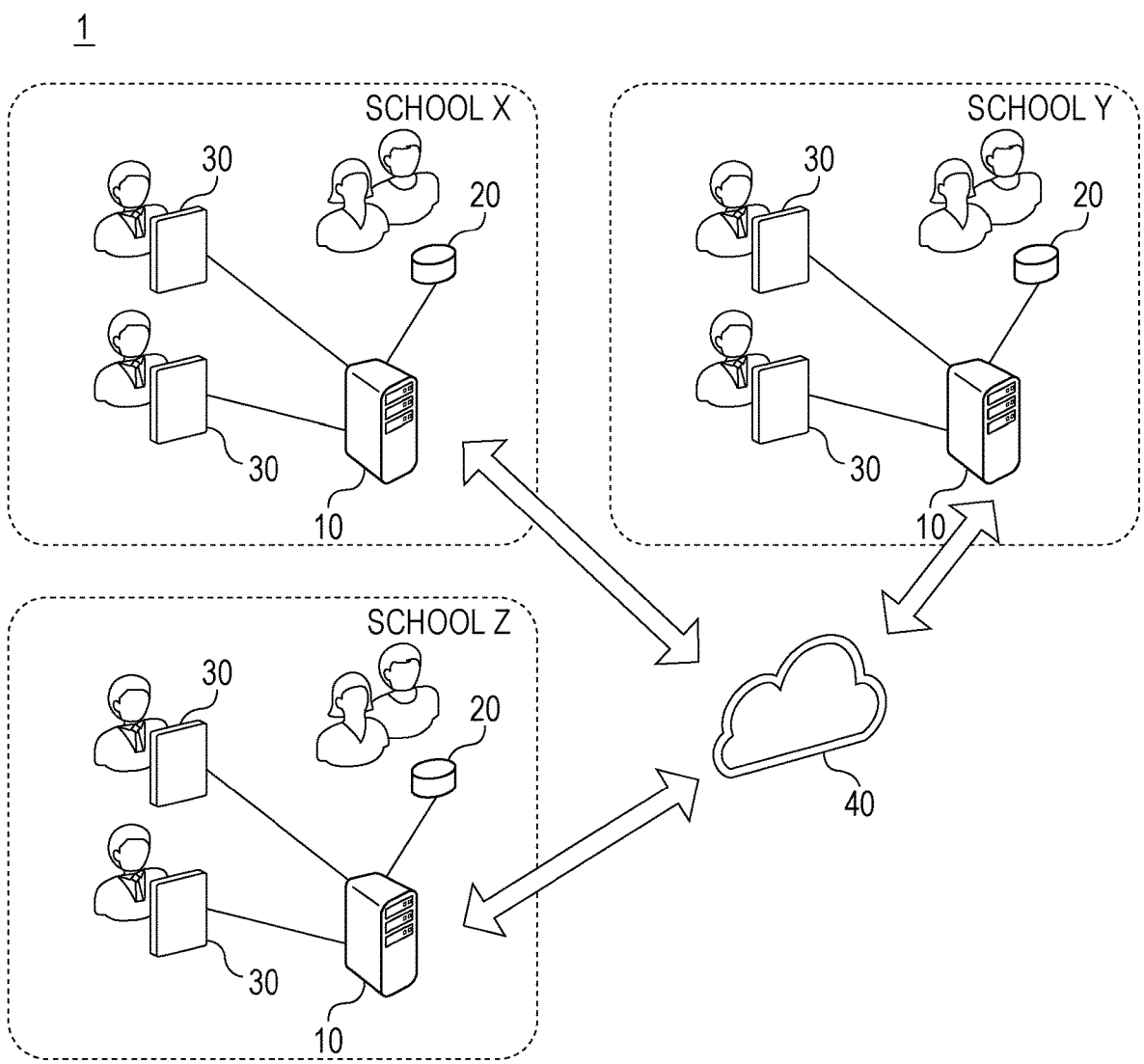
FIG. 1 is a diagram illustrating an outline of an information presentation system according to an exemplary embodiment of the present disclosure.

Exemplary embodiments of the present disclosure will be explained below with reference to drawings. In the drawings, same or equivalent components and parts are referred to with the same reference signs. In addition, for the sake of explanation, dimension ratios in the drawings are exaggerated and may be different from actual ratios.

FIG. 1 is a diagram illustrating an outline of an information presentation system according to an exemplary embodiment of the present disclosure. In this exemplary embodiment, explanation will be provided, based on the assumption of a scene where multiple students have a conversation at school, as a scene where a group of multiple people have a conversation. However, the present disclosure is not limited to a scene at school and may be applied to any type of conversation scene. Conversations at school are merely an example.

An information presentation system 1 according to this exemplary embodiment collects activity information on activities of students who are having conversations and presents advices regarding the progress of the conversations to teachers, based on past cases or the like, in classes at multiple schools (for example, school X to school Z). Activity information represents biological information on utterance of a student who is having a conversation and the living body of the student. As illustrated in FIG. 1, information presentation apparatuses 10 are installed at the schools X to Z. Each of the information presentation apparatuses 10 is able to communicate with an information acquisition apparatus 20 and a terminal 30 that a teacher uses in a class. Furthermore, each of the information presentation apparatuses 10 transmits various types of information on a class, such as information collected by the information acquisition apparatus 20 and information input to the terminal 30 by a teacher, to a cloud server 40 that provides services for supporting classes, so that information may be shared among the multiple schools. The information acquisition apparatus 20 presents, based on the information collected at the cloud server 40, an advice regarding the process of a conversation, in accordance with a situation of the conversation defined by activity information on students who are having the conversation.

Figure 2:
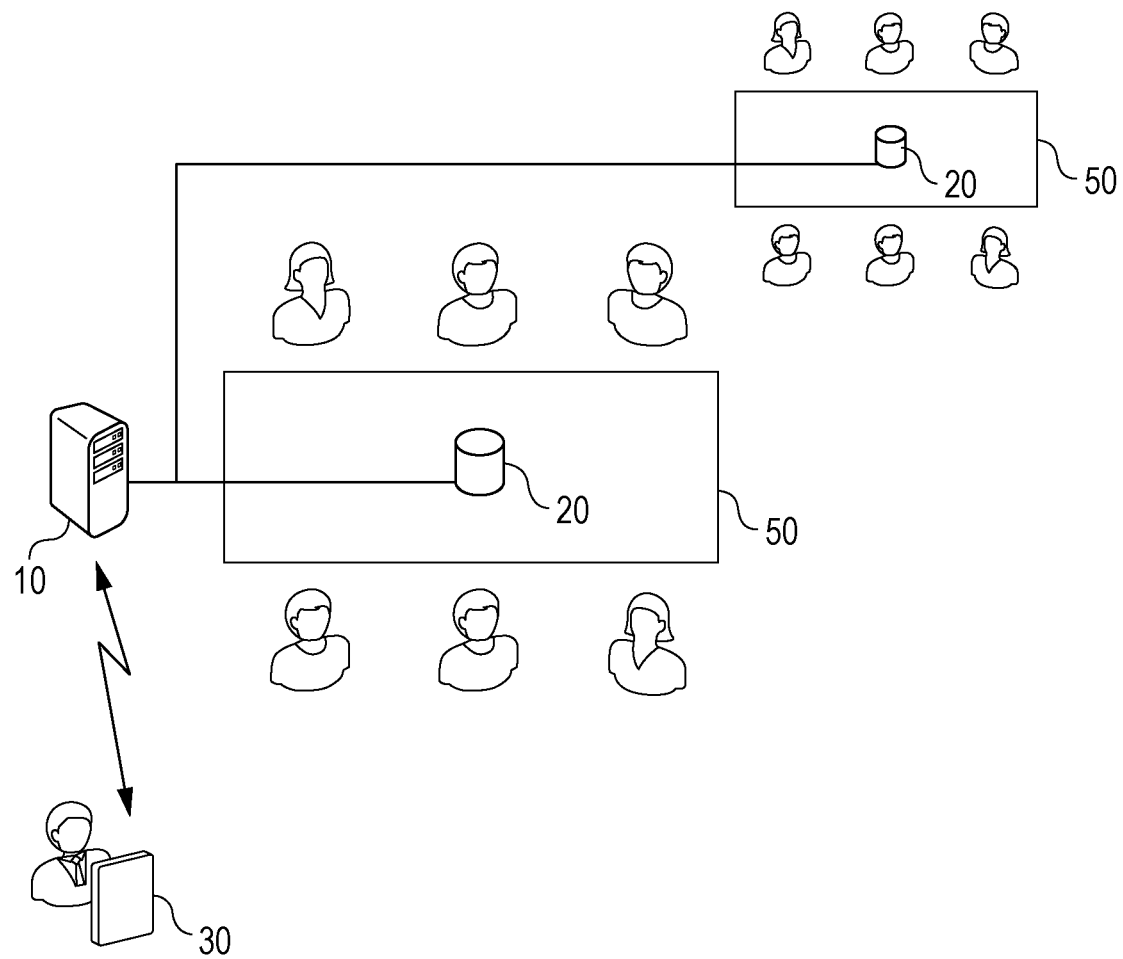
FIG. 2 is a diagram illustrating an example of a class at school.

FIG. 2 is a diagram illustrating an example of a class at school.

In the example illustrated in FIG. 2, there are a plurality of groups each including multiple students. An information acquisition apparatus 20 is installed at a table 50 for each group. The multiple information acquisition apparatuses 20 installed are connected to an information presentation apparatus 10. The information presentation apparatus 10 is able to communicate with a terminal 30 that belongs to a teacher and performs transmission and reception of information required in a class.

The information acquisition apparatuses 20 acquire activity information on students who are having conversations about a specific theme, and transmit the acquired activity information to the information presentation apparatus 10. The information presentation apparatus 10 identifies a situation of a conversation among students at each of the tables 50, based on the acquired activity information, and presents, in accordance with the situation of the conversation, an advice regarding the progress of the conversation to the teacher via the terminal 30 belonging to the teacher. The terminal 30 may be a computer of any type such as a desktop type or a portable type. The terminal 30 is, for example, a tablet.

The information presentation apparatuses 10, the information acquisition apparatuses 20, and the terminal 30 will be explained below.

(Information Presentation Apparatuses 10)

Figure 3:
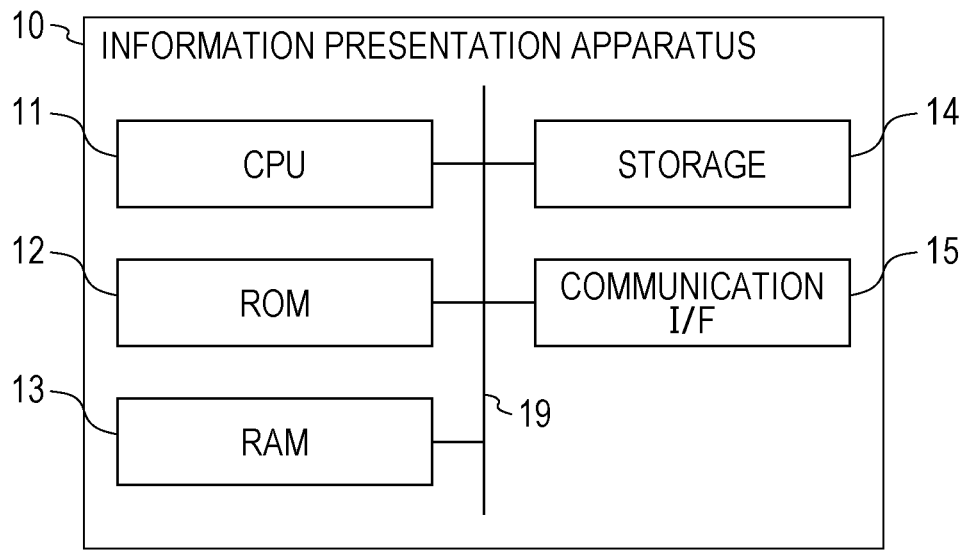
FIG. 3 is a block diagram illustrating a hardware configuration of an information presentation apparatus.

FIG. 3 is a block diagram illustrating a hardware configuration of an information presentation apparatus.

As illustrated in FIG. 3, the information presentation apparatus 10 includes a central processing unit (CPU) 11, a read only memory (ROM) 12, a random access memory (RAM) 13, a storage 14, and a communication interface (I/F) 15. These components are connected to each other so that they are able to communicate with each other via a bus 19.

The CPU 11 executes various programs and controls the individual components. That is, the CPU 11 reads a program from the ROM 12 or the storage 14, and executes the program using the RAM 13 as an operation region. The CPU 11 controls the individual components and performs various types of arithmetic processing in accordance with a program recorded in the ROM 12 or the storage 14. In this exemplary embodiment, an information presentation program for presenting an advice regarding the progress of a conversation is stored in the ROM 12 or the storage 14.

Various programs and various data are stored in the ROM 12. A program or data is temporarily stored in the RAM 13 as an operation region. The storage 14 includes a hard disk drive (HDD) or a solid state drive (SSD). Various programs including an operating system and various data are stored in the storage 14.

The communication interface 15 is an interface to communicate with other apparatuses such as the information acquisition apparatus 20, the terminal 30, the cloud server 40, and the like. For example, standards such as Ethernet®, FDDI, Wi-FI®, or the like are used for the communication interface 15.

Figure 4:
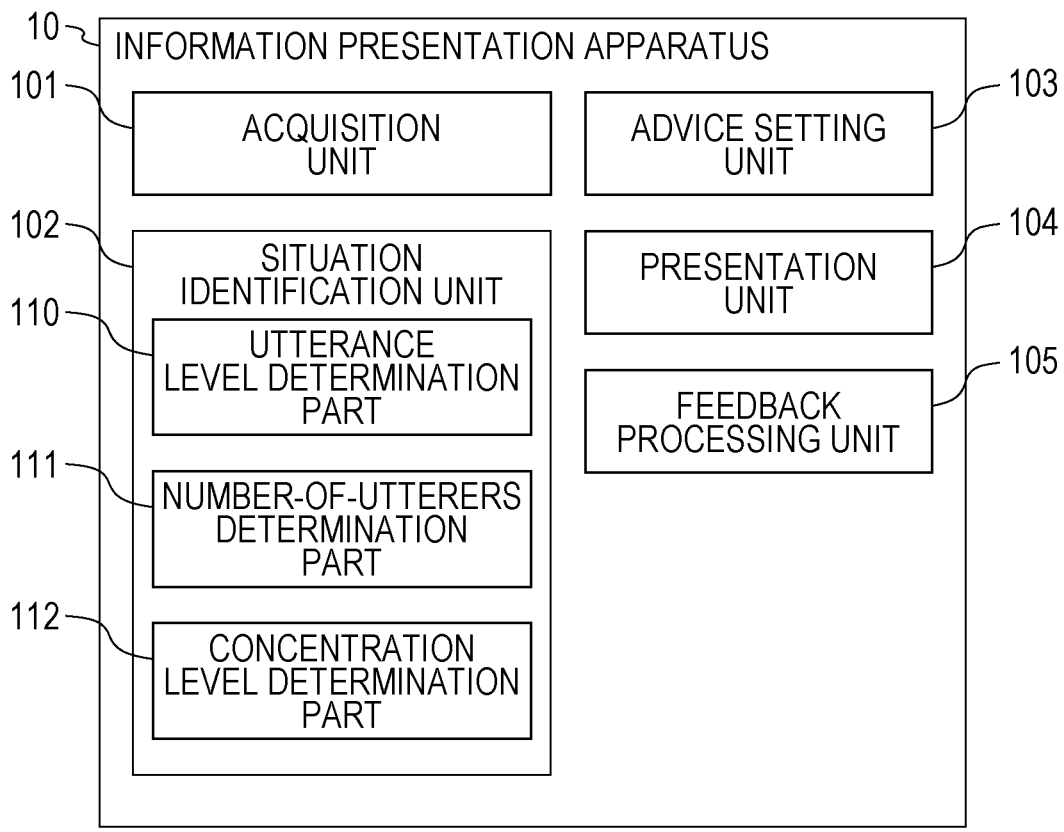
FIG. 4 is a block diagram illustrating an example of a functional configuration of an information presentation apparatus.

FIG. 4 is a block diagram illustrating an example of a functional configuration of an information presentation apparatus. Individual functional configurations are implemented when the CPU 11 reads and executes the information presentation program stored in the ROM 12 or the storage 14.

As illustrated in FIG. 4, the information presentation apparatus 10 includes an acquisition unit 101, a situation identification unit 102, an advice setting unit 103, a presentation unit 104, and a feedback processing unit 105.

The acquisition unit 101 acquires activity information on activities of people in a group including multiple people who are having a conversation about a specific theme. That is, the acquisition unit 101 acquires, from the information acquisition apparatuses 20, activity information on students acquired by the information acquisition apparatuses 20. Activity information is information on a voice produced by a person who is speaking and biological information on the living body of the person who is speaking. In this exemplary embodiment, information on brain waves of students and information on images of the faces of the students are acquired from the information acquisition apparatuses 20.

The situation identification unit 102 identifies a situation of a conversation among people in a group, based on activity information acquired by the acquisition unit 101. To determine a situation of a conversation, the situation identification unit 102 includes an utterance level determination part 110, a number-of-utterers determination part 111, and a concentration level determination part 112.

The utterance level determination part 110 determines an utterance level that indicates a degree indicating how much people speak in a conversation, based on information on voices in the conversation. The number-of-utterers determination part 111 determines the number of utterers that indicates the number of people who are speaking in a conversation, based on information on voices in the conversation. The concentration level determination part 112 determines a concentration level that indicates a degree indicating how much students are concentrated on a conversation, based on brain waves of the students and images of the faces of the students. Determination of the utterance level, determination of the number of utterers, and determination of the concentration level will be described in detail later.

The advice setting unit 103 sets an advice corresponding to a situation of a conversation defined by activity information acquired by the acquisition unit 101, that is, a situation of a conversation defined according to the utterance level, the number of utterers, and the concentration level determined by the situation identification unit 102. Setting of an advice will be described in detail later.

The presentation unit 104 presents an advice set by the advice setting unit 103 to a teacher (user). The presentation unit 104 presents an advice by causing the terminal 30 to display or announce the advice. Alternatively, the presentation unit 104 may cause the information acquisition apparatus 20 installed at each table to display or announce the advice.

The feedback processing unit 105 receives a feedback about an advice presented by the presentation unit 104 from a teacher. The received feedback is shared at the cloud server 40 for further improvement of the accuracy of future advices.

(Information Acquisition Apparatus 20)

Figure 5:
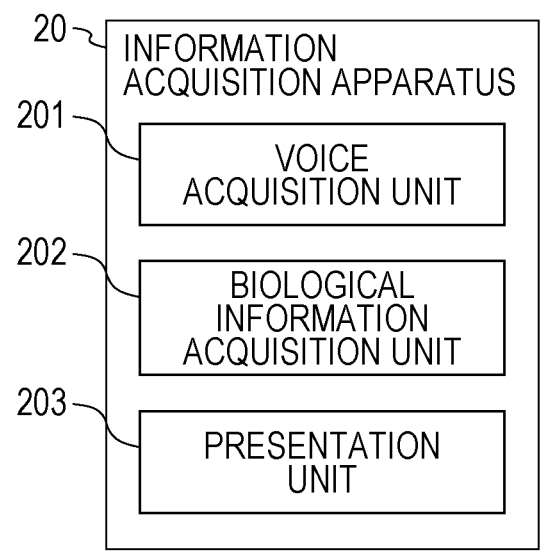
FIG. 5 is a block diagram illustrating an example of a functional configuration of an information acquisition apparatus.

FIG. 5 is a block diagram illustrating an example of a functional configuration of an information acquisition apparatus.

Each of the information acquisition apparatuses 20 includes a voice acquisition unit 201, a biological information acquisition unit 202, and a presentation unit 203.

The voice acquisition unit 201 is implemented by a microphone or the like. The voice acquisition unit 201 acquires voices of multiple students in a conversation about a specific theme.

The biological information acquisition unit 202 acquires biological information on the living body of a student. The information acquisition apparatus 20 requires a dedicated hardware configuration corresponding to the type of biological information to be acquired. For example, in the case where brain waves of a student are to be acquired as biological information, a brain wave measurement device including multiple electrodes to be made in contact with the head of the student is required. Furthermore, in the case where pulse waves of a student are to be acquired as biological information, a pulse wave measurement device including a sensor to detect movement of skin by pulsation or a sensor to detect pulse waves in a contactless way by applying infrared rays or the like is required. Furthermore, in the case where an image of the face (expression) of a student is to be acquired as biological information, an imaging device including an imaging element to capture an image of the face of the student is required.

The presentation unit 203 presents information to a student. The presentation unit 203 is implemented by, for example, a display, a speaker, or the like. The presentation unit 203 displays or announces an advice regarding the progress of a conversation.

(Terminal 30)

Figure 6:
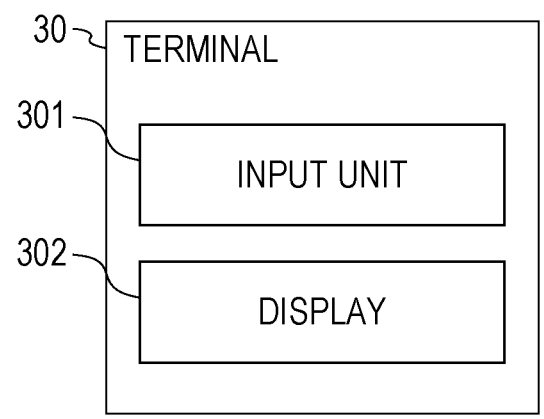
FIG. 6 is a block diagram illustrating an example of a functional configuration of a terminal used by a teacher.

FIG. 6 is a block diagram illustrating an example of a functional configuration of a terminal used by a teacher.

The terminal 30 includes an input unit 301 and a display 302.

The input unit 301 receives necessary input by a teacher (user). The input unit 301, for example, as a display of a touch panel type, receives touch input from the user.

The display 302 displays information required for a teacher, such as an advice or the like presented by the presentation unit 104.

Next, determination of the utterance level, determination of the number of utterers, and determination of the concentration level at the information presentation apparatus 10 described above will be explained in detail.

(Determination of Utterance Level)

FIG. 7 is a table indicating determination criteria for an utterance level.

As described above, the information presentation apparatus 10 determines, as the utterance level determination part 110, an utterance level that indicates a degree indicating how much people speak in a conversation, based on information on voices in the conversation. The degree indicating how much people speak is determined, for example, based on an utterance time in a predetermined period of time (for example, sixty seconds) in a conversation among a group of students. The determination as to whether or not there is an utterance may be determined based on whether or not there is a voice. In a case where someone in a group speaks at one point in time, it is determined that there is an utterance by the group.

For example, the utterance level determination part 110 acquires the proportion of the utterance time in sixty seconds, which is a predetermined period of time, as a percentage. However, percentage is not necessarily acquired. Ratio may be acquired or an utterance level may be determined as described below by measuring only an utterance time. A case where the proportion of the utterance time is acquired as a percentage so that the utterance level is determined will be explained below.

As illustrated in FIG. 7, in the case where the proportion of the utterance time is 0% or more and less than 20%, the utterance level determination part 110 determines that there is least active discussion, and defines the current utterance level as level 1. In the case where the proportion of the utterance time is 20% or more and less than 40%, the utterance level determination part 110 determines that there are a small number of remarks, and defines the current utterance level as level 2. In the case where the proportion of the utterance time is 40% or more and less than 60%, the utterance level determination part 110 determines that there are some discussions but not many remarks, and defines the current utterance level as level 3. In the case where the proportion of the utterance time is 60% or more and less than 80%, the utterance level determination part 110 determines that there are active discussions, and defines the current utterance level as level 4. In the case where the proportion of the utterance time is 80% or more and less than or equal to 100%, the utterance level determination part 110 determines that there are very active discussions, and defines the current utterance level as level 5.

As described above, the utterance level determination part 110 determines the utterance level as an element to identify the situation of a conversation among a group. Explanation about how the situation of a conversation among a group is identified using the utterance level will be provided in detail later.

(Determination of Number of Utterers)

As described above, the information presentation apparatus 10 determines, as the number-of-utterers determination part 111, the number of utterers who are speaking in a conversation, based on information on voices in the conversation.

Specifically, the number-of-utterers determination part 111 identifies an utterer by, for example, comparing information on a voice (utterance) in a conversation acquired from the acquisition unit 101 with information on a registered voice of a student. A voice of a student is individually acquired by the voice acquisition unit 201 or the like of the information acquisition apparatus 20 before a conversation among a group of students starts, and is stored in the storage 14 or the like of the information presentation apparatus 10 via the acquisition unit 101.

When a conversation starts among a group of students, the number-of-utterers determination part 111 counts, for each specific period of time (for example, sixty seconds), the number of utterers. It is preferable that the specific period of time is equal to the specific period of time for the determination of the utterance level described above. The number-of-utterers determination part 111 identifies an utterance of a student and counts the student as one of the number of utterers. Then, even if the same student speaks again within the specific period of time, the student is not counted as the number of utterers and the number of utterers is not increased.

As described above, the number-of-utterers determination part 111 determines the number of utterers as an element to identify the situation of a conversation among a group. Explanation about how the situation of a conversation among a group is identified using the number of utterers will be provided in detail later.

(Determination of Concentration Level)

Figure 9:
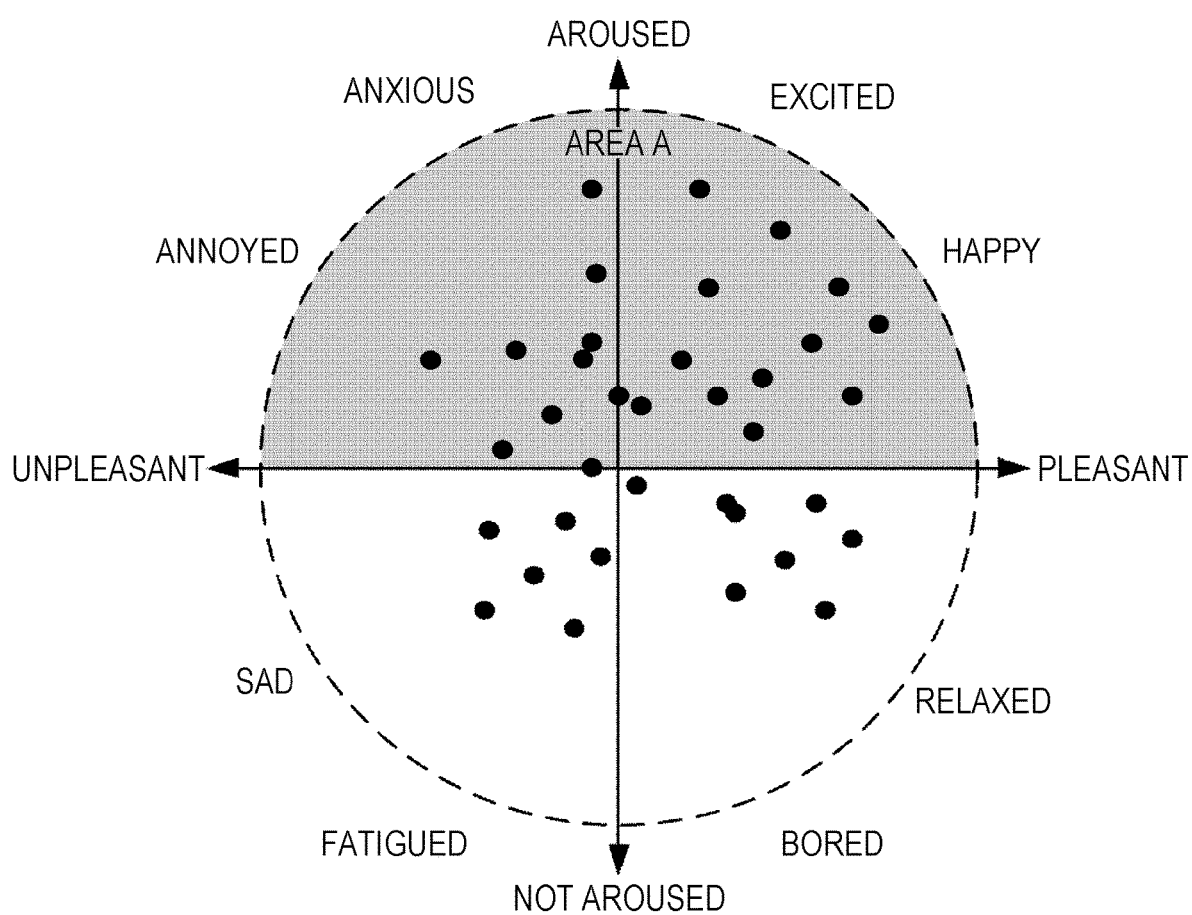
FIG. 9 is a diagram illustrating an example of a circular model representing emotions of human beings.

FIG. 8 is a table indicating determination criteria for a concentration level. FIG. 9 is a diagram illustrating an example of a circular model representing emotions of human beings. FIG. 10 is a table indicating different determination criteria for the concentration level.

As described above, the information presentation apparatus 10 determines, as the concentration level determination part 112, a concentration level that indicates a degree indicating how much students are concentrated on a conversation, based on brain waves of the students. The degree indicating how much students are concentrated on a conversation is determined, for example, by a power spectral ratio of α waves (7.5 Hz to 11.75 Hz) to β waves (13 Hz to 30 Hz) contained in brain waves of each of the students in the conversation. The power spectral ratio of α waves to β waves is obtained by comparing power spectrums obtained by fast Fourier transform on α waves and β waves and is, for example, the ratio of the power spectrum of α waves to the power spectrum of β waves. The concentration level determination part 112 calculates the degree of concentration of each student, based on the power spectral ratio, and calculates the average power spectral ratio by obtaining the average of all the students in a group. The concentration level determination part 112 determines the concentration level, based on the obtained average power spectral ratio.

As illustrated in FIG. 8, in the case where the average power spectral ratio is less than 0.7, the concentration level determination part 112 determines that the students are in a relaxed state and thinking power is low, and defines the current concentration level as level 1. In the case where the average power spectral ratio is 0.7 or more and less than 0.9, the concentration level determination part 112 determines that the current state is a state between level 1 and level 3, and defines the current concentration level as level 2. In the case where the average power spectral ratio is 0.9 or more and less than 1.1, the concentration level determination part 112 determines that the students are in a relaxed state and thinking power is satisfactory but not high enough to increase the cognitive level, and defines the current concentration level as level 3. In the case where the average power spectral ratio is 1.1 or more and less than 1.3, the concentration level determination part 112 determines that the current state is a state between level 3 and level 5, and defines the current concentration level as level 4. In the case where the average power spectral ratio is 1.3 or more, the concentration level determination part 112 determines that thinking power is high and ideal for increasing the cognitive level, and defines the current concentration level as level 5.

Furthermore, the concentration level determination part 112 may determine the concentration level, based on criteria different from those used for the determination of the concentration level described above. In this case, the information presentation apparatus 10 determines, as the concentration level determination part 112, the concentration level that indicates the degree indicating how much students are concentrated on a conversation, based on images of the faces of the students. Emotions are identified by categorizing images of the faces of students acquired by the information acquisition apparatus 20 on a Russell's emotion circular model.

An image of the face of a student is acquired, for example, by capturing images of the face of the student in a group a specific number of times (for example, six times) for a specific period of time (for example, sixty seconds) by the biological information acquisition unit 202. For example, as illustrated in FIG. 2, in a case where an image of the face of each of six students sitting at a table 50 is captured six times for sixty seconds, thirty-six face images are acquired in total. In this case, the biological information acquisition unit 202 rotates an imaging element six times for sixty seconds at the table 50, so that the faces of the six students are each scanned six times. Accordingly, face images are acquired. Emotions are identified from the acquired face images in accordance with a known method and are plotted on the Russell's circular model, and distribution is thus acquired as illustrated in FIG. 9. In the circular model illustrated in FIG. 9, area A indicated in gray represents an area where the degree of concentration is high. Therefore, as the number of plots in the area A increases, the degree of concentration on a conversation as a group increases.

As illustrated in FIG. 10, in the case where the proportion of the plots in the area A in all the plots is 0% or more and less than 20%, the concentration level determination part 112 determines that thinking power is decreased and the current state is not suitable for learning, and defines the current concentration level as level 1. In the case where the proportion of the plots in the area A in all the plots is 20% or more and less than 40%, the concentration level determination part 112 determines that the current state is higher than and slightly closer to level 1, and defines the current concentration level as level 2. In the case where the proportion of the plots in the area A in all the plots is 40% or more and less than 60%, the concentration level determination part 112 determines that the current state is an intermediate state indicating an average level, and defines the current concentration level as level 3. In the case where the proportion of the plots in the area A in all the plots is 60% or more and less than 80%, the concentration level determination part 112 determines that the current state is higher than level 3 and slightly close to level 5, and defines the current concentration level as level 4. In the case where the proportion of the plots in the area A in all the plots is 80% or more and less than or equal to 100%, the concentration level determination part 112 determines that the students are in a positive state and high learning effects are expected, and defines the current concentration level as level 5.

As described above, the concentration level determination part 112 determines the concentration level as one or two elements to identify the state of a conversation among a group. Explanation about how the situation of a conversation among a group is identified using the concentration level will be provided in detail later. In the above example, the concentration level is determined based on brain waves or face images. However, for example, the concentration level may be determined by detecting parasympathetic nerve (anxiety) or the like based on pulse waves.

Next, operation of an information presentation apparatus will be explained.

Figure 11:
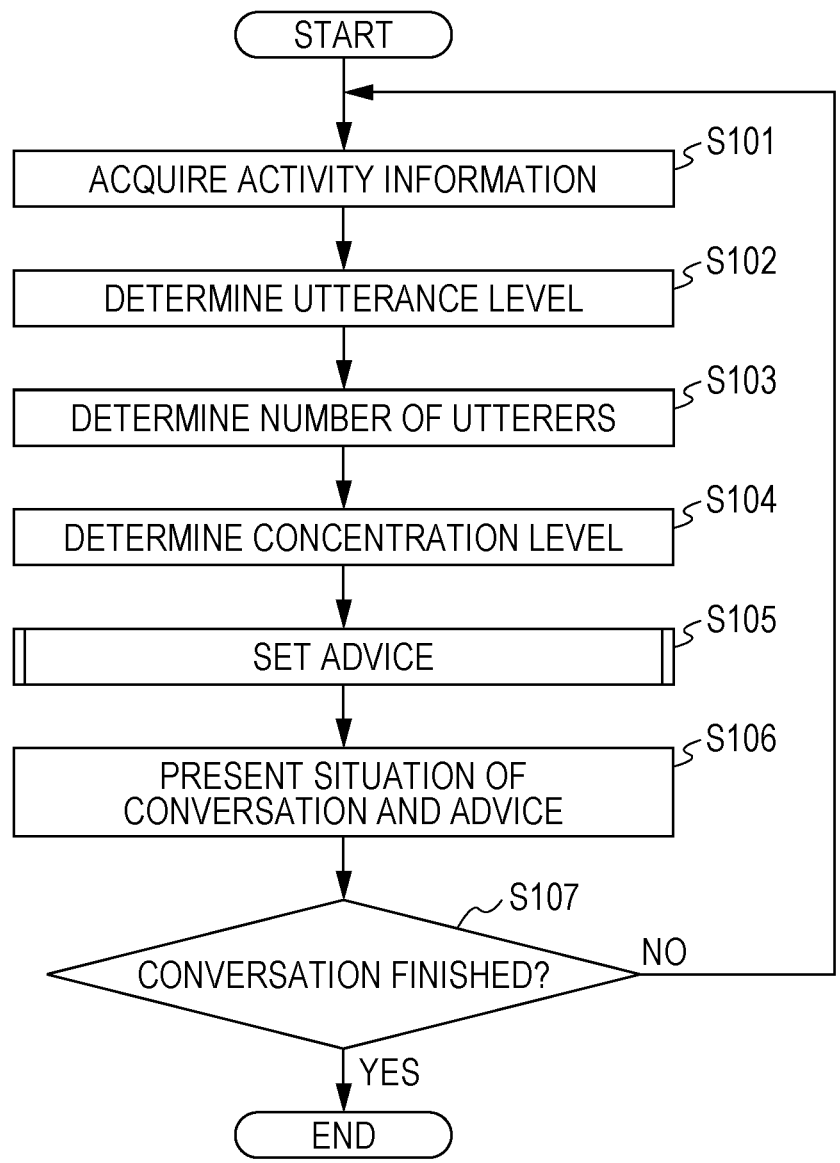
FIG. 11 is a flowchart illustrating the flow of information presentation by an information presentation apparatus.

FIG. 11 is a flowchart illustrating the flow of information presentation by an information presentation apparatus.

When the CPU 11 reads an information presentation program from the ROM 12 or the storage 14 and executes the information presentation program, an information presentation process is performed. In the case where there are a plurality of groups that have conversations about a specific theme, the information presentation process described below is performed for individual groups in a concurrent manner.

The CPU 11 acquires, as the voice acquisition unit 201, activity information (voice information and biological information) (step S101). The CPU 11 determines, based on the acquired activity information, an utterance level (step S102), determines the number of utterers (step S103), and determines a concentration level (step S104). Methods for determining the utterance level, the number of utterers, and the concentration level are as described above. Steps S102 to S104 are not necessarily performed in that order and may be performed in a reverse order or performed concurrently.

The CPU 11 sets, in accordance with a situation of a conversation defined by the determined utterance level, the determined number of utterers, and the determined concentration level, an advice regarding the process of the conversation (step S105). Setting of an advice will be explained in detail later. The CPU 11 presents, as the presentation unit 104, the advice set in step S105 (step S106). In this processing, the CPU 11 presents the situation of the conversation as well as the advice.

The CPU 11 determines whether or not the conversation is finished (step S107). The determination as to whether the conversation is finished may be made, for example, when a teacher inputs an instruction to end the conversation to the terminal 30 and the the information presentation apparatus 10 receives the instruction. Alternatively, a conversation time or class time is input in advance to the information presentation apparatus 10, so that ending of the conversation may be determined by a timer.

In the case where the conversation is not finished (step S107: No), the CPU 11 repeats the processing from step S101. In the case where the conversation is finished (step S107: Yes), the CPU 11 ends the information presentation process.

Next, a process for setting an advice in step S105 will be explained in detail.

Figure 12:
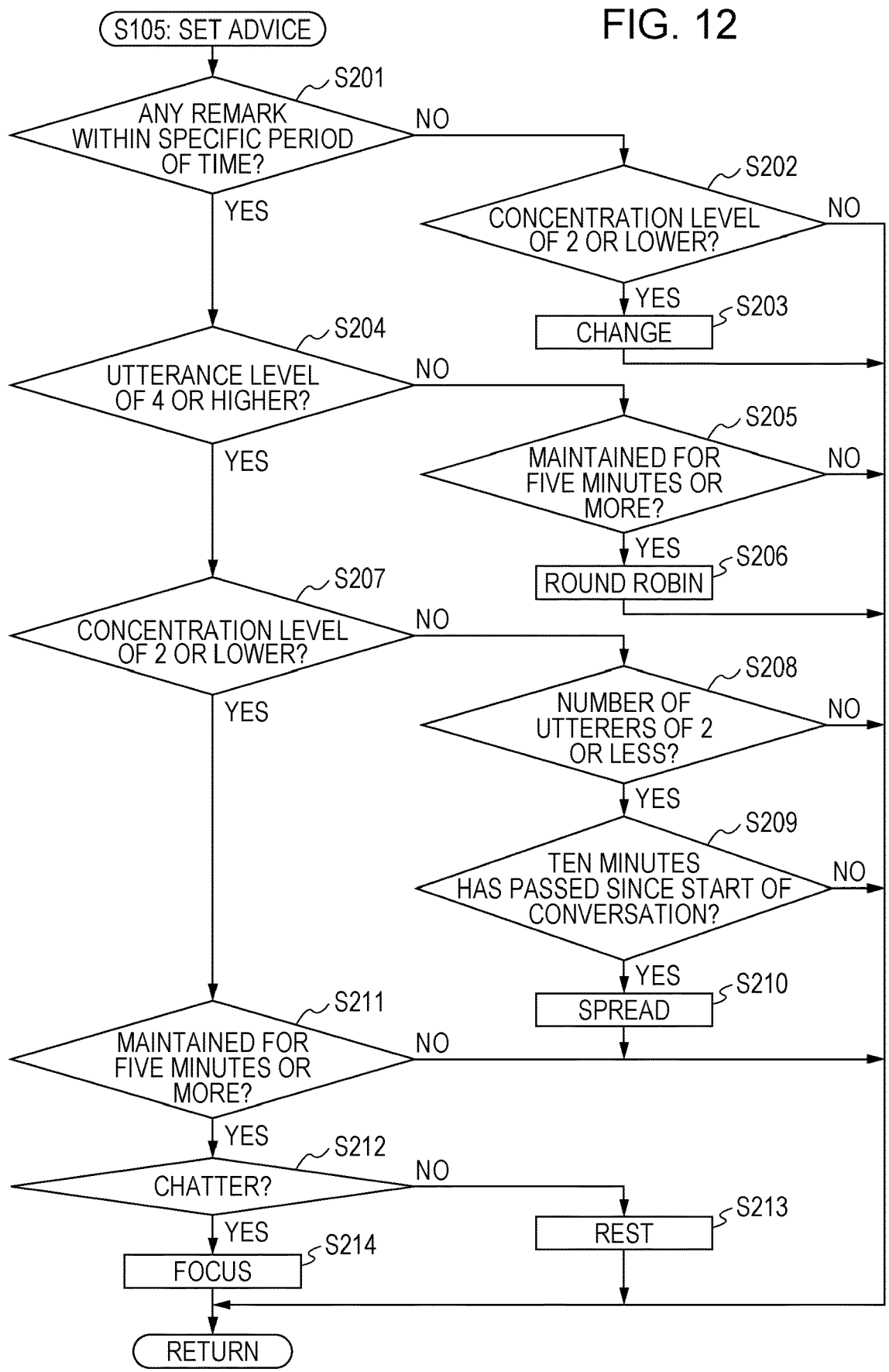
FIG. 12 is a flowchart illustrating the flow of a process for setting an advice.

FIG. 12 is a flowchart illustrating the flow of a process for setting an advice. FIG. 13 is a table indicating situations of conversations and details of advices corresponding to the situations of the conversations.

The CPU 11 determines whether or not there is a remark within a specific period of time (first period of time) (step S201). The specific period of time is, for example, sixty seconds. It is preferable that the specific period of time is equal to the specific period of time for the determination of the concentration level described above.

In the case where there is no remark within the specific period of time (step S201: No), the CPU 11 determines whether or not the concentration level determined in step S104 is 2 (first threshold) or lower (step S202). In the case where the concentration level is 2 or lower (step S202: Yes), the CPU 11 sets the advice corresponding to the situation of the conversation to "change" (step S203). That is, in the case where there is no remark within the specific period of time and the concentration level is 2 or lower, the situation of the conversation is identified as "a situation where the total concentration level of students is decreased" or "a situation where the original concentration level is low". An advice suitable for this situation is "change", as illustrated in FIG. 13. Specific details of "change" are, for example, "change contents from the current lecture to different one that students seem to be interested in". Then, the CPU 11 returns to the process illustrated in FIG. 11.

Referring back to explanation for step S202, in the case where the concentration level is higher than 2, that is, the concentration level is 3 or higher (step S202: No), there is no situation of a conversation that may be identified at the present stage and there is no corresponding advice. Therefore, the CPU 11 returns to the process illustrated in FIG. 11.

Referring back to explanation for step S201, in the case where there is a remark within the specific period of time (step S201: Yes), the CPU 11 determines whether or not the utterance level determined ins step S102 is 4 (second threshold) or higher (step S204). In the case where the utterance level is lower than 4, that is, the utterance level is 3 or lower (step S204: No), the CPU 11 determines whether or not a situation where there is a remark within the specific period of time and the utterance level is 3 or lower is maintained for five minutes (second period of time) or more (step S205). In the case where the situation is maintained for five minutes or more (step S205: Yes), the CPU 11 sets the advice corresponding to the situation of the conversation to "round robin" (step S206). That is, in the case where the situation where there is a remark within the specific period of time and the utterance level is 3 or lower is maintained for five minutes or more, the situation of the conversation is identified as "a situation where the conversation level is still low even after a certain period of time has passed since start of remarks". The advice suitable for this situation is "round robin", as illustrated in FIG. 13. Specific details of "round robin" are, for example, "prompt students to speak one by one in turn to ease tension". The CPU 11 returns to the process illustrated in FIG. 11.

Referring back to explanation for step S205, in the case where the situation where there is a remark within the specific period of time and the concentration level is 3 or lower is not maintained for five minutes or more (step S205: No), there is no situation of a conversation that may be identified at the present stage and there is no corresponding advice. Therefore, the CPU 11 returns to the process illustrated in FIG. 11.

Referring back to explanation for step S204, in the case where the utterance level is 4 or higher (step S204: Yes), the CPU 11 determines whether or not the concentration level determined in step S104 is 2 (first threshold) or lower (step S207). In the case where the concentration level is higher than 2, that is, the concentration level is 3 or higher (step S207: No), the CPU 11 determines whether or not the number of utterers determined in step S103 is 2 (first number of utterers) or less (step S208). In the case where the number of utterers is more than 2, that is, the number of utterers is 3 or more (step S208: No), the CPU 11 returns to the process illustrated in FIG. 11.

In the case where the number of utterers is 2 or less (step S208: Yes), the CPU 11 determines whether or not ten minutes (third period of time) has passed since start of the conversation (step S209). In the case where ten minutes has not passed (step S209: No), the CPU 11 returns to the process illustrated in FIG. 11. In the case where ten minutes has passed (step S209: Yes), the CPU 11 sets the advice corresponding to the situation of the conversation to "spread" (step S210). That is, in the case where there is a remark within the specific period of time, the utterance level is 4 or higher, the concentration level is 3 or higher, the number of utterers is 2 or less, and ten minutes has passed since start of the conversation, the situation of the conversation is identified as "a situation where when a certain period of time has passed since start of the conversation, the number of utterers is small in spite of a high utterance level". The advice suitable for this situation is "spread", as illustrated in FIG. 13. Specific details of "spread" are, for example, "prompt a student who has not spoken to speak and make a remark on contents of the conversation". The CPU 11 returns to the process illustrated in FIG. 11.

Referring back to explanation for step S207, in the case where the concentration level is two or lower (step S207: Yes), the CPU 11 determines whether or not a situation where there is a remark within the specific period of time, the utterance level is 4 or higher, and the concentration level is 2 or lower is maintained for five minutes (fourth period of time) or more (step S211). In the case where the situation is not maintained for five minutes or more (step S211: No) the CPU 11 returns to the process illustrated in FIG. 11.

In the case where the situation is maintained for five minutes or more (step S211: Yes), the CPU 11 determines whether or not the conversation is chatter (step S212). The determination as to whether or not the conversation is chatter will be explained in detail later.

In the case where the conversation is chatter (step S212: Yes), the CPU 11 sets the advice corresponding to the situation of the conversation to "focus". That is, in the case where the situation where there is a remark within the specific period of time, the utterance level is 4 or higher, and the concentration level is 2 or lower is maintained for five minutes or more and the conversation is chatter, the situation of the conversation is identified as "a situation where according to semantic comprehension of the contents of the conversation, the contents of the conversation are less relevant to the theme of the conversation, and the concentration level is low". The advice suitable for this situation is "focus", as illustrated in FIG. 13. Specific details of "focus" are, for example, "to redirect the course, represent the theme and the goal of the conversation, and give a guidance by presenting an example, if possible". The CPU 11 returns to the process illustrated in FIG. 11.

In the case where the conversation is not chatter (step S212: No), the CPU 11 sets the advice corresponding to the situation of the conversation to "rest". That is, in the case where a situation where there is a remark within the specific period of time, the utterance level is 4 or higher, and the concentration level is 2 or lower is maintained for five minutes or more and the conversation is not chatter, the situation of the conversation is identified as "a situation where the conversation level is high but the concentration level is significantly decreased compared to a certain period of time ago". The advice suitable for this situation is "rest", as illustrated in FIG. 13. Specific details of "rest" are, for example, "change the topic to be deviated from the theme of the conversation, and bring up a topic that students seem to be interested in or take a break". The CPU 11 returns to the process illustrated in FIG. 11.

As described above, the information presentation apparatus 10 determines the situation of a conversation, according to the combination of the utterance level, the number of utterers, and the concentration level, and sets an advice determined in advance according to the situation of the conversation.

The concentration level used in steps S202 and S207 may be either the concentration level determined according to brain waves or the concentration level determined according to an image of a face, as described above. Furthermore, the first threshold, the second threshold, the first period of time, the second period of time, the third period of time, the fourth period of time, and the first number of utterers are used as thresholds to be used for identifying the situation of a conversation. Although specific numerical values are used as examples in the above explanation, the above numerical values are not necessarily used. Thresholds may be changed in an appropriate manner according to a situation of a conversation to be identified.

Next, the determination as to whether or not the conversation is chatter in step S212 will be explained.

Figure 14:
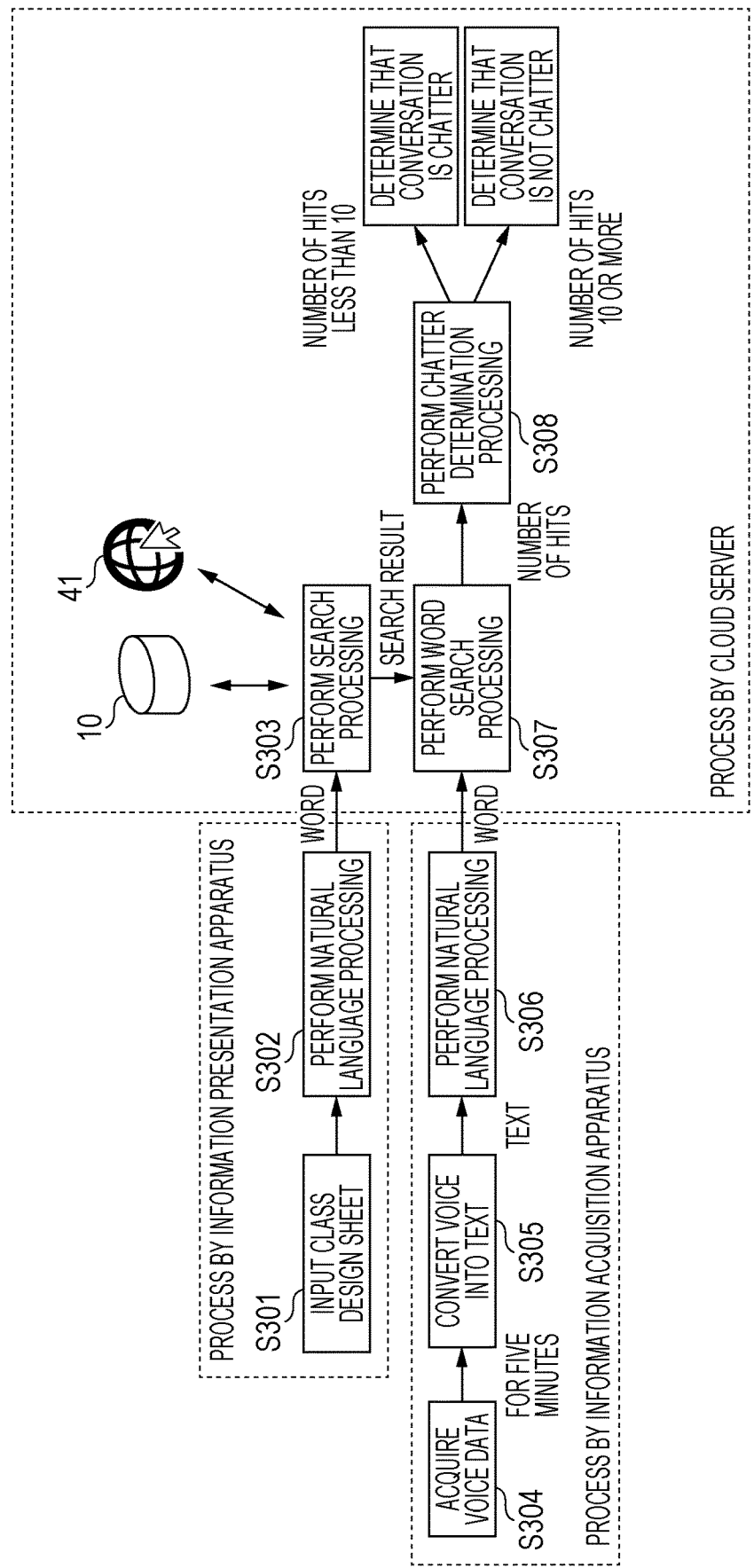
FIG. 14 is a process chart illustrating the flow of a process for determining whether or not a conversation is chatter.

FIG. 14 is a process chart illustrating the flow of a process for determining whether or not a conversation is chatter. Steps S301 to S302 are performed by the information presentation apparatus 10, steps S304 to S306 are performed by the information acquisition apparatus 20, and steps S303, S307, and S308 are performed by the cloud server 40.

In the information presentation apparatus 10, a class design sheet is input and stored in advance into the storage 14 or the like (step S301). The class design sheet is, for example, a sheet in which explanations for an object, a purpose, a configuration, a target to be achieved, and the like of a class such as a syllabus are written. The information presentation apparatus 10 performs natural language processing on a sentence in the class design sheet to extract a meaningful word (step S302).

The cloud server 40 receives the word extracted in step S302 from the information presentation apparatus 10, and searches a different information presentation apparatus 10 of another (different) school and an external database 41 for a word associated with the received word (step S303). A word associated with the extracted word is, for example, a word included in a class design sheet, a report submitted in a class, or the like stored in the different information presentation apparatus 10. By defining a word obtained by searching the different information presentation apparatus 10 and the external database 41, using the word extracted in step S302 as a search key, as an associated word, a list of words associated with the class design sheet input in step S301 is established in the cloud server 40.

The information acquisition apparatus 20 acquires voice data of students in a conversation about a specific theme (step S304). Then, the information acquisition apparatus 20 converts the acquired voice data into text data with specific time intervals (for example, for each five minutes) (step S305). The information acquisition apparatus 20 performs natural language processing on text of the text data, and extracts a meaningful word (step S306). Accordingly, words appearing in the conversation among the students are extracted.

The cloud server 40 receives the words extracted in step S306, and searches for a word in the word list established in the search processing of step S303 from among the received words (step S307). That is, the cloud server 40 searches the word list established in the search processing of step S303 for the word used in the conversation extracted in step S306. The cloud server 40 determines, as chatter determination processing, whether or not the number of words appearing in the conversation that are the same as the words acquired in steps S302 and S303 is equal to or more than a specific number (step S308). The specific number is, for example, 10. The specific number may be changed in an appropriate manner. In the case where the number of words appearing in the conversation that are the same as the words acquired in steps S302 and S303 is less than 10, the information presentation apparatus 10 determines that the conversation is chatter. This is because most of the words extracted from the conversation are not relevant to the class design. On the other hand, in the case where the number of words appearing in the conversation that are the same as the words acquired in steps S302 and S303 is 10 or more, the information presentation apparatus 10 determines that the conversation is not chatter.

The cloud server 40 performs steps S303, S307, and S308 because the cloud server 40 is able to access any information presentation apparatus 10. The cloud server 40 utilizes information on class design sheets, reports, and the like of other schools by accessing information presentation apparatuses 10 of the schools.

Next, an example of a mode in which an advice is present to a user such as a teacher in step S106 will be provided.

Figure 15:
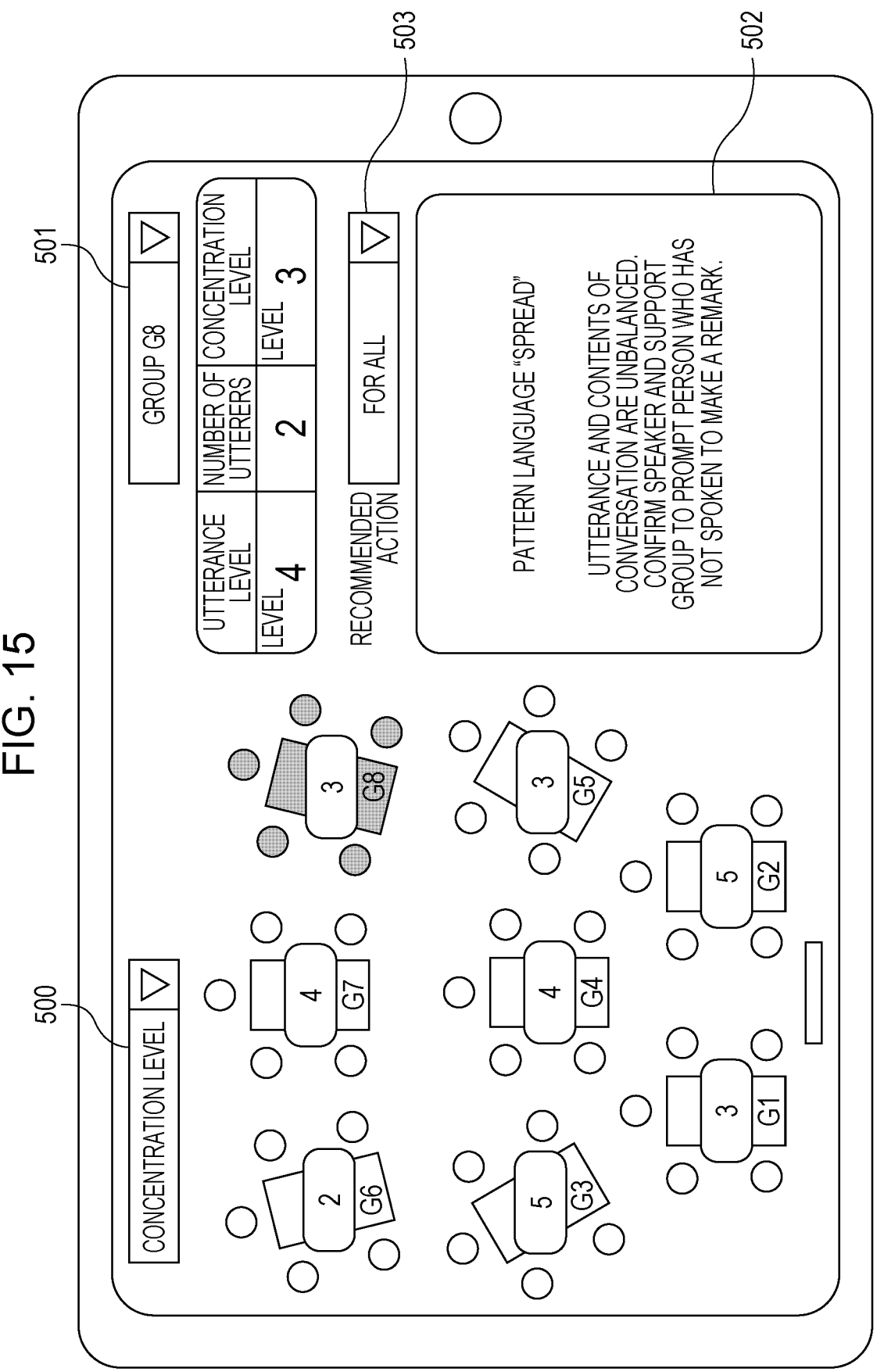
FIG. 15 is a diagram illustrating an example of a screen displayed on a terminal.

FIG. 15 is a diagram illustrating an example of a screen displayed on the terminal 30. The screen displayed on the terminal 30 is based on information transmitted from the information presentation apparatus 10. That is, the information presentation apparatus 10 causes the terminal 30 to provide necessary display.

As illustrated in FIG. 15, for example, the layout of a plurality of students divided into multiple groups is displayed on the terminal 30. A table for each group is illustrated, and a sign indicating each group is illustrated. In the example illustrated in FIG. 15, there are groups G1 to G8.

A menu 500 for selecting between the utterance level, the number of utterers, and the concentration level is provided on the screen. For example, a user is able to select a desired item from the menu 500, using a pull-down method. When a teacher selects one of the utterance level, the number of utterers, and the concentration level from the menu 500, a parameter for the selected item is displayed so as to correspond to each group. For example, as illustrated in FIG. 15, when the "concentration level" is selected from the pull-down menu, numerical values indicating the concentration level for conversations among the groups are displayed on the tables for the groups G1 to G8. Therefore, regarding the specific item, the teacher is able to confirm the situation of the conversation taking place among each group.

Furthermore, a menu 501 for selecting a specific group is provided on the screen. As illustrated in FIG. 15, in the case where the group G8 is selected, the utterance level, the number of utterers, and the concentration level of the group G8 are displayed. Therefore, regarding all of the utterance level, the number of utterers, and the concentration level of a specific group, the teacher is able to confirm the situation of the conversation. The group selected from the menu 501 may be displayed in a different color so as to be distinguished from the other groups.

Furthermore, a display window 502 for displaying an advice for progress of the conversation is provided on the screen. On the display window 502, an advice corresponding to the situation of the conversation described above is displayed. A specific group or all, which includes all the groups, may be selected from a menu 503. In the case where a specific group is selected, an advice for the selected group is displayed. In the case where all is selected, an advice is displayed taking into consideration the situation of the conversation among the group.

In addition to selection of a desired group to confirm the situation of a conversation as described above, a group in a bad conversation situation may be clearly indicated. For example, for display of the layout, a group for which at least one or all of the utterance level, the number of utterers, and the concentration level are equal to or less than a specific index, such as a median, may be displayed in a color different from the other groups or displayed in a flashing manner.

Furthermore, in the case where it is considered, based on teacher's confirmation on the situation of an actual conversation, that the advice presented on the screen illustrated in FIG. 15 is not appropriate or a different advice is preferable, the information presentation apparatus 10 may receive, as the feedback processing unit 105, a feedback. In this case, the teacher may input suitability or unsuitability of an advice by inputting a feedback into a specific field on the terminal 30 or pressing a specific button. The feedback is transmitted from the terminal 30 to the information presentation apparatus 10. The information presentation apparatus 10 further transmits the feedback to the cloud server 40, so that feedbacks may be collected in the cloud server 40.

The information presentation system 1 has been explained above. However, the present disclosure is not limited to the above exemplary embodiment. Improvement or alteration may be made to the present disclosure in an appropriate manner within the technical scope of the present disclosure. Modifications will be explained below.

(First Modification)

In the exemplary embodiment described above, the case where the process illustrated in FIG. 12 is used for the processing in step S105 illustrated in FIG. 11 for setting an advice is specifically explained. In this modification, a process illustrated in FIG. 16 is performed in place of the process illustrated in FIG. 12 or concurrently with the process illustrated in FIG. 12.

Figure 16:
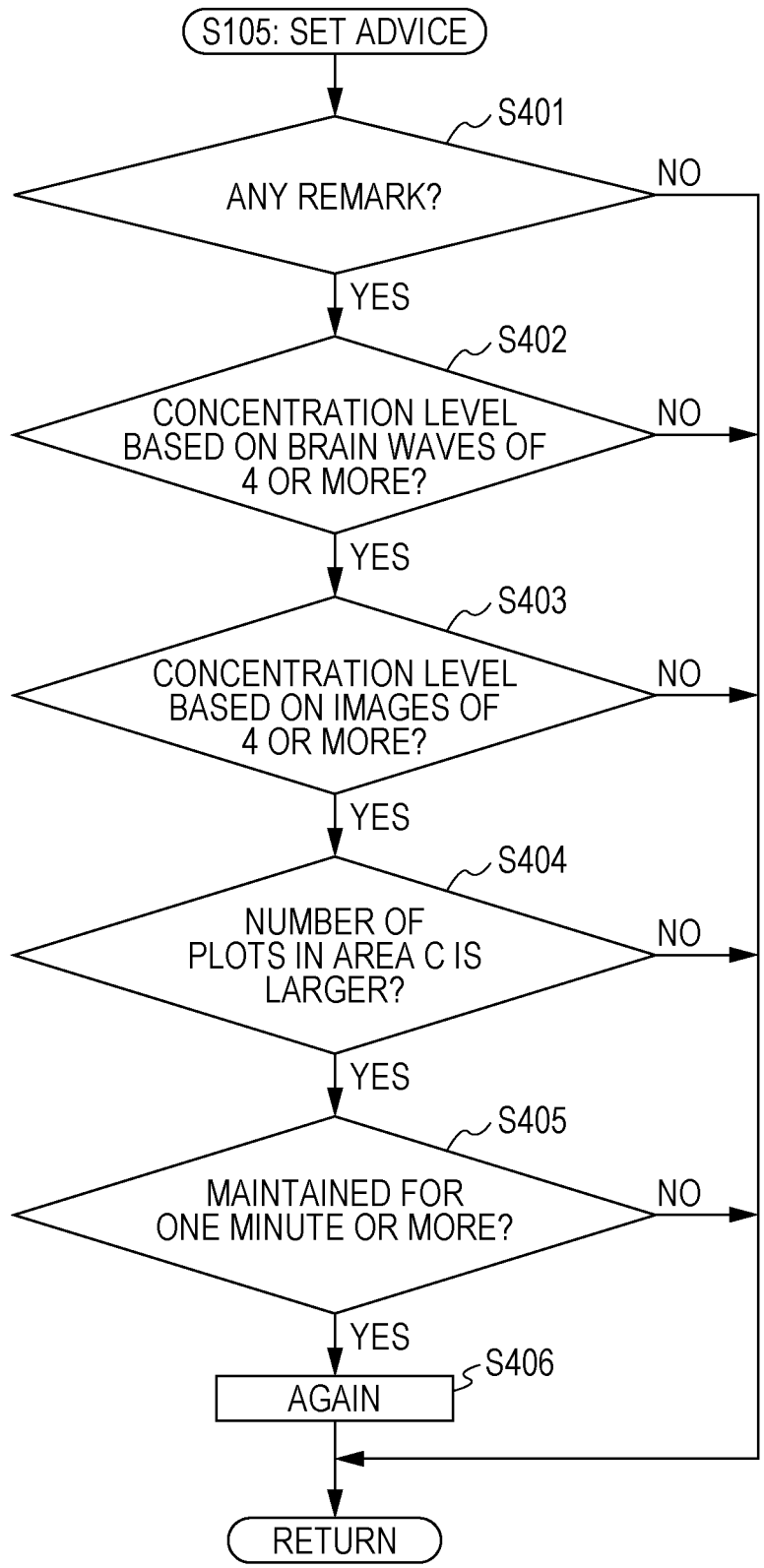
FIG. 16 is a flowchart illustrating the flow of a process for setting an advice.
Figure 17:
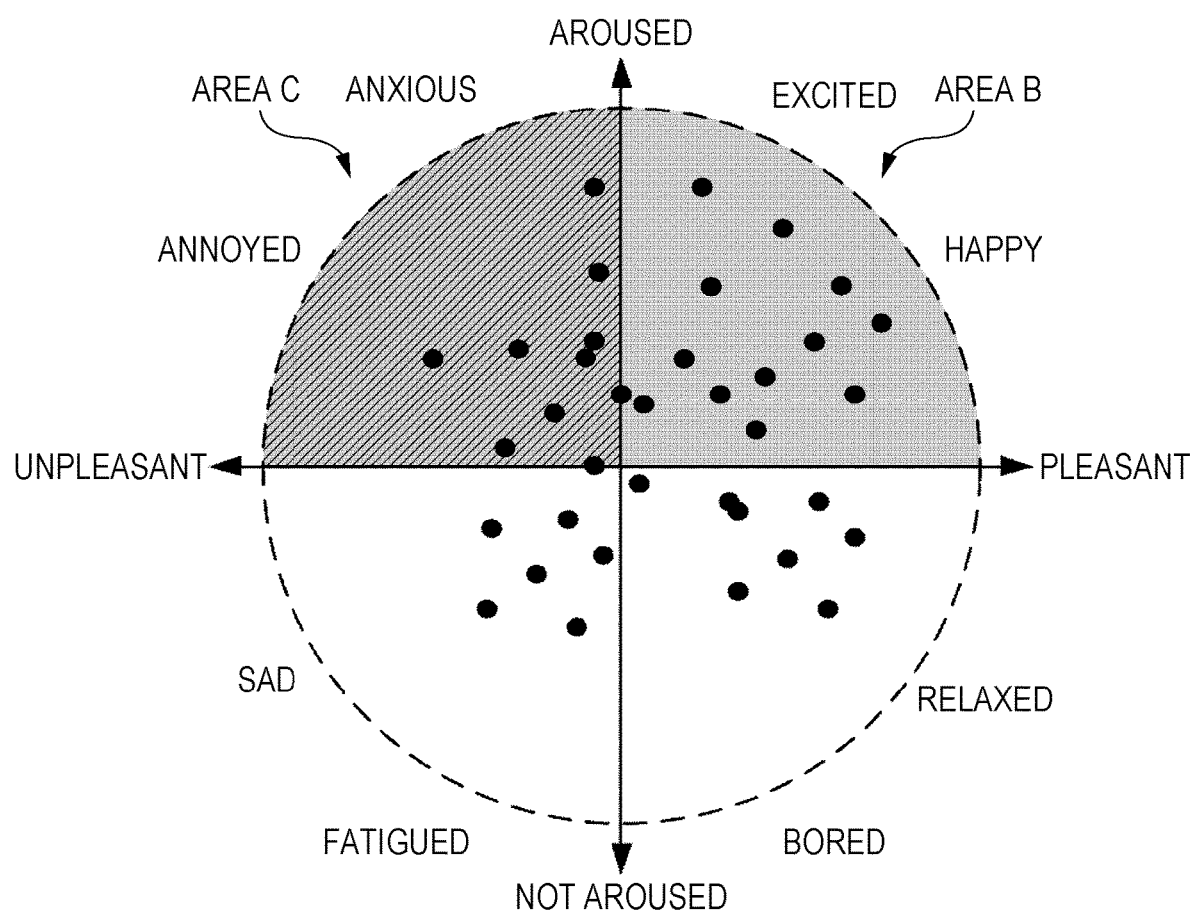
FIG. 17 is a diagram illustrating an example in which a circular model representing emotions of human beings includes two regions.

FIG. 16 is a flowchart illustrating the flow of a process for setting an advice. FIG. 17 is a diagram illustrating an example in which a circular model representing emotions of human beings includes two regions. As in FIGS. 11 and 12, the process illustrated in FIG. 16 is performed when the CPU 11 of the information presentation apparatus 10 reads an information presentation program from the ROM 12 or the storage 14 and executes the information presentation program.

As illustrated in FIG. 16, the CPU 11 determines whether or not a student in a conversation speaks about a specific theme (step S401). In the case where there is no remark by a student (step S401: No), the CPU 11 returns to the process illustrated in FIG. 11.

In the case where there is a remark by a student (step S401: Yes), the CPU 11 determines whether or not the concentration level based on brain waves is 2 or more (step S402). The concentration level based on brain waves is determined based on α waves and β waves of students according to the determination criteria illustrated in FIG. 8, as described above. In the case where the concentration level based on brain waves is less than 4, that is, the concentration level is 3 or less (step S402: No), the CPU 11 returns to the process illustrated in FIG. 11.

In the case where the concentration level based on brain waves is 4 or more (step S402: Yes), the CPU 11 determines whether or not the concentration level based on images is 4 or more (step S403). The concentration level based on images is determined based on images of the faces of students according to the determination criteria illustrated in FIG. 10, as described above. At least one image of the face of each of all students included in a group needs to be acquired, and therefore, determination of the concentration level based on images takes a longer time than determination of the concentration level based on brain waves. In the case where the concentration level based on images is less than 4, that is, the concentration level is 3 or less (step S403: No), the CPU 11 returns to the process illustrated in FIG. 11.

In the case where the concentration level based on images is 4 or more (step S403: Yes), the CPU 11 refers to a plot distribution result on a Russell's emotion circular model based on the images and determines whether or not the number of plots in the area C is larger than that in the area B (step S404). In this exemplary embodiment, as illustrated in FIG. 17, the area B is an upper light region of the circular model, and the area C is an upper left region of the circular model. Both the areas B and C are upper areas of the circular model and are regions where a plot is obtained when a student is aroused. The area B is a region where a plot is obtained when a student is positive in terms of emotions, such as when a student is aroused, and at the same time, feels excited, happy, or pleasant. In contrast, the area C is a region in which a plot is obtained when a student is negative in terms of emotions, such as when a student is aroused, and at the same time, feels anxious, annoyed, or unpleasant.

In the case where the number of plots in the area C is not larger than the area B, that is, in the case where the number of plots in the area B is larger than the area C (step S404: No), the CPU 11 returns to the process illustrated in FIG. 11. In the case where the number of plots in the area C is larger than the area B (step S404: Yes), the CPU 11 determines whether or not a situation where results of all the determinations in steps S402 to S404 are Yes is maintained for one or more minutes (step S405). In the case where the situation is not maintained for one or more minutes (step S405: No), the CPU 11 returns to the process illustrated in FIG. 11. In the case where the situation is maintained for one or more minutes (step S405: Yes), the CPU 11 sets an advice corresponding to the situation of the conversation to "again" (step S406). That is, in the case where the situation where results of all the determinations in steps S402 to 404 are Yes is maintained for one or more minutes, the situation of the conversation is identified as "a situation where students are concentrated on the conversation but feel unpleasant". This situation may occur, for example, in a case where students listen to remark by a certain student but do not understand the intension of the remark and feel unpleasant. Therefore, an advice suitable for this situation of the conversation is to support promotion of understanding of the remark. Specific details of "again" are "prompt a student who spoke to make a remark with a different expression again". The CPU 11 returns to the process illustrated in FIG. 11.

As described above, according to this modification, the situation of a conversation may be determined based on a combination of concentration levels determined from different types of biological information (brain waves and emotions based on facial expression). The determination of the concentration level based on brain waves in step S402 is performed before the determination of the concentration level based on images in step S403 because the determination of the concentration level based on brain waves takes a shorter time than the determination of the concentration level based on images. If the determination result in step S402 is No, there is no need to perform the processing of step S403, which requires a longer time to perform determination, and omission of step S403 contributes to improvement of the entire processing speed for setting an advice.

(Second Modification)

In the exemplary embodiment described above, a mode in which the terminal 30 belonging to a teacher presents an advice has been explained. However, only a teacher does not necessarily control the progress of a conversation among a group. For example, a student in a group may be assigned as a facilitator, and the student may control the progress of a conversation. Alternatively, the progress of a conversation may be determined, without a facilitator, by the group referring to an advice. In this case, the information acquisition apparatus 20 installed on the table 50 may directly present an advice to students. In this case, for example, the screen illustrated in FIG. 15 is displayed on the presentation unit 203 of the information acquisition apparatus 20. Alternatively, an advice may be presented by voice from the speaker provided at the information acquisition apparatus 20.

Furthermore, in the exemplary embodiment, a situation where a group has a conversation at school has been explained as an example. However, as described above, the present disclosure is not necessarily applied to a conversation among a group in a class at school and may be applied to any conversation. For example, the present disclosure may be applied to a discussion among a group in a training for working adults. The present disclosure may also be applied to a discussion about a specific theme in a conference. That is, for any situation where a person, such as a facilitator, who facilitates the progress of a discussion is able to play a role, the present disclosure may be applied as an aid or substitution of a facilitator.

The above processes may be implemented by a dedicated hardware circuit. In this case, the above processes may be implemented by a single piece of hardware or multiple pieces of hardware.

Furthermore, an information presentation program for causing the information presentation apparatus 10 to operate may be provided by a computer-readable recording medium such as a universal serial bus (USB) memory, a flexible disc, a compact disc-read only memory (CD-ROM), or the like or may be provided online via a network such as the Internet. In this case, the program recorded in the computer-readable recording medium is normally transferred to and stored in a memory, a storage, or the like. Furthermore, for example, the program may be provided as an individual piece of application software or may be integrated as a function of the information presentation apparatus 10 into software of each apparatus.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information presentation apparatus comprising:
   an acquisition unit that acquires activity information on activities of people in a group including a plurality of people having a conversation about a specific theme, wherein the activity information is at least one of voice information on a voice given by each of the plurality of people or biological information on a living body of each of the plurality of people;
   a presentation unit that presents advice regarding progress of the conversation in accordance with a situation of the conversation defined based on the activity information acquired by the acquisition unit;
   a situation identification unit that:
      defines, in a case where the voice information, out of the voice information and the biological information, is acquired by the acquisition unit, the situation of the conversation, according to at least one of an utterance time or a number of utterers that are identified based on the voice information;
- defines, in a case where the biological information, out of the voice information and the biological information, is acquired by the acquisition unit, the situation of the conversation, according to information on at least one of brain waves or pulse waves acquired as the biological information and emotions of the people identified based on the biological information; and
- defines, in a case where both the voice information and the biological information are acquired by the acquisition unit, the situation of the conversation, according to the utterance time and the number of utterers identified based on the voice information and information on at least one of the brain waves or pulse waves acquired as the biological information and the emotions of the people identified based on the biological information.

2. The information presentation apparatus according to claim 1,
wherein the situation identification unit
- determines a concentration level that indicates a degree indicating how much the people are concentrated on the conversation, based on information on at least one of the brain waves, the pulse waves, or the emotions of the people,
- determines an utterance level that indicates a degree indicating how much the people speak in the conversation, based on the voice information,
- determines the number of utterers that indicates a number of people who speak in the conversation, based on the voice information, and
- defines the situation of the conversation, based on results of the determinations.

3. The information presentation apparatus according to claim 2,
wherein in a case where there is no remark by the people for a first period of time and the determined concentration level is less than or equal to a first threshold, the situation identification unit identifies the situation of the conversation as a situation where the people are not concentrated on the conversation, and
wherein the presentation unit presents, as the advice for the situation identified by the situation identification unit, a suggestion for changing contents of the conversation.

4. The information presentation apparatus according to claim 3,
wherein in a case where a situation where the determined utterance level is less than a second threshold is maintained for a second period of time or more, the situation identification unit identifies the situation of the conversation as a situation where a conversation level is low due to tension, and
wherein the presentation unit presents, as the advice for the situation identified by the situation identification unit, a suggestion for giving the plurality of people chances to speak in turn.

5. The information presentation apparatus according to claim 4,
wherein in a case where the determined utterance level is equal to or more than the second threshold, the determined concentration level is more than the first threshold, the determined number of utterers is less than or equal to a first number of utterers, and a conversation period of time is equal to or more than a third period of time, the situation identification unit identifies the situation of the conversation as a situation where only some of the plurality of people speak, and
wherein the presentation unit presents, as the advice for the situation identified by the situation identification unit, a suggestion for prompting a person who has not spoken to make a remark.

6. The information presentation apparatus according to claim 5,
wherein in a case where a situation where the determined utterance level is equal to or more than the second threshold and the determined concentration level is less than or equal to the first threshold is maintained for a fourth period of time or more and it is determined that the conversation is chatter, the situation identification unit identifies the situation of the conversation as a situation where contents of the conversation are less relevant to the specific theme of the conversation and the people are not concentrated on the conversation, and
wherein the presentation unit presents, as the advice for the situation identified by the situation identification unit, a suggestion for reconfirming a purpose of the conversation.

7. The information presentation apparatus according to claim 6,
wherein in a case where a situation where the determined utterance level is equal to or more than the second threshold and the concentration level is less than or equal to the first threshold is maintained for the fourth period of time or more and it is determined that the conversation is not chatter, the situation identification unit identifies the situation of the conversation as a situation where the concentration level is low in spite of a large amount of remarks, and
wherein the presentation unit presents, as the advice for the situation identified by the situation identification unit, a suggestion for having a break.

8. The information presentation apparatus according to claim 1,
wherein the situation identification unit
- determines, based on the brain waves and emotions of the people, the concentration level that indicates the degree indicating how much the people are concentrated on the conversation, determines, based on the emotions of the people, whether the people feel positive or negative about the conversation, and
- identifies, in a case where the concentration level determined based on the brain waves is equal to or more than a third threshold, the concentration level determined based on the emotions of the people is equal to or more than a fourth threshold, and the people feel positive about the conversation, that the situation of the conversation is a situation where people in the group do not listen to a remark by a person in a concentrated manner, and
wherein the presentation unit presents, as the advice for the situation identified by the situation identification unit, a suggestion for prompting the person who has spoken to make a remark again.

9. The information presentation apparatus according to claim 1,
wherein the presentation unit causes a display that is capable of displaying the advice to display the situation of the conversation defined by the activity information and an advice corresponding to the situation of the conversation.

10. The information presentation apparatus according to claim 9,
wherein in a case where there are a plurality of groups, the presentation unit causes the display to display the situation of the conversation among each of the plurality of groups.

11. The information presentation apparatus according to claim 10,
wherein the presentation unit acquires an index indicating the situation of the conversation among each of the plurality of groups and causes the display to perform display such that a group with an index smaller than a threshold is distinguished from other groups.

12. An information presentation method comprising:
acquiring activity information on activities of people in a group including a plurality of people having a conversation about a specific theme,
wherein the activity information is at least one of voice information on a voice given by each of the plurality of people or biological information on a living body of each of the plurality of people;
presenting advice regarding progress of the conversation in accordance with a situation of the conversation defined based on the acquired activity information;
defining, in a case where the voice information, out of the voice information and the biological information, is acquired, the situation of the conversation, according to at least one of an utterance time or a number of utterers that are identified based on the voice information;
defining, in a case where the biological information, out of the voice information and the biological information, is acquired, the situation of the conversation, according to information on at least one of brain waves or pulse waves acquired as the biological information and emotions of the people identified based on the biological information; and
defining, in a case where both the voice information and the biological information are acquired, the situation of the conversation, according to the utterance time and the number of utterers identified based on the voice information and information on at least one of the brain waves or pulse waves acquired as the biological information and the emotions of the people identified based on the biological information.

13. A non-transitory computer readable medium storing a program causing a computer to execute a process for information presentation, the process comprising:
acquiring activity information on activities of people in a group including a plurality of people having a conversation about a specific theme,
wherein the activity information is at least one of voice information on a voice given by each of the plurality of people or biological information on a living body of each of the plurality of people;
presenting advice regarding progress of the conversation in accordance with a situation of the conversation defined based on the acquired activity information;
defining, in a case where the voice information, out of the voice information and the biological information, is acquired, the situation of the conversation, according to at least one of an utterance time or a number of utterers that are identified based on the voice information;
defining, in a case where the biological information, out of the voice information and the biological information, is acquired, the situation of the conversation, according to information on at least one of brain waves or pulse waves acquired as the biological information and emotions of the people identified based on the biological information; and
defining, in a case where both the voice information and the biological information are acquired, the situation of the conversation, according to the utterance time and the number of utterers identified based on the voice information and information on at least one of the brain waves or pulse waves acquired as the biological information and the emotions of the people identified based on the biological information.

* * * * *